(12) United States Patent
Bhagavathiperumal et al.

(10) Patent No.: US 9,374,308 B2
(45) Date of Patent: Jun. 21, 2016

(54) OPENFLOW SWITCH MODE TRANSITION PROCESSING

(71) Applicant: LENOVO ENTERPRISE SOLUTIONS (SINGAPORE) PTE. LTD., New Tech Park (SG)

(72) Inventors: Chidambaram Bhagavathiperumal, Santa Clara, CA (US); Yi Bo Song, Wuxi (CN); Liang Yang, Nanjing (CN)

(73) Assignee: LENOVO ENTERPRISE SOLUTIONS (SINGAPORE) PTE. LTD., Singapore (SG)

(*) Notice: Subject to any disclaimer, the term of this patent is extended or adjusted under 35 U.S.C. 154(b) by 547 days.

(21) Appl. No.: 14/015,681

(22) Filed: Aug. 30, 2013

(65) Prior Publication Data

US 2015/0063108 A1 Mar. 5, 2015

(51) Int. Cl.
H04L 12/801 (2013.01)
H04L 12/931 (2013.01)
H04L 12/721 (2013.01)

(52) U.S. Cl.
CPC ............ H04L 47/12 (2013.01); H04L 49/00 (2013.01); H04L 45/38 (2013.01)

(58) Field of Classification Search
CPC .......... H04L 45/38; H04L 47/12; H04L 49/00
See application file for complete search history.

(56) References Cited

U.S. PATENT DOCUMENTS

| 7,251,245 | B2 | 7/2007 | Oman | |
|---|---|---|---|---|
| 8,327,014 | B2 | 12/2012 | Foschiano et al. | |
| 2004/0086097 | A1* | 5/2004 | Olafsson | H04L 5/1438 379/93.32 |
| 2008/0049621 | A1* | 2/2008 | McGuire | H04L 12/24 370/236.2 |
| 2009/0270175 | A1* | 10/2009 | Kelly | G07F 17/3225 463/42 |
| 2011/0022812 | A1* | 1/2011 | van der Linden | G06F 9/5077 711/163 |
| 2011/0090853 | A1* | 4/2011 | Chandramouli | H04W 28/10 370/329 |
| 2011/0286324 | A1* | 11/2011 | Bellagamba | H04L 41/0677 370/219 |
| 2012/0215933 | A1 | 8/2012 | Liu | |
| 2012/0300615 | A1 | 11/2012 | Kempf et al. | |
| 2013/0028073 | A1* | 1/2013 | Tatipamula | H04L 41/12 370/218 |
| 2013/0028142 | A1* | 1/2013 | Beheshti-Zavareh | H04L 45/22 370/255 |
| 2013/0132536 | A1 | 5/2013 | Zhang et al. | |
| 2013/0148656 | A1 | 6/2013 | Zhang et al. | |
| 2013/0151676 | A1 | 6/2013 | Thakkar et al. | |
| 2013/0215769 | A1* | 8/2013 | Beheshti-Zavareh | H04L 45/64 370/252 |
| 2013/0268686 | A1* | 10/2013 | Wang | H04L 65/1069 709/228 |
| 2014/0133492 | A1* | 5/2014 | Takajo | H04L 45/22 370/401 |
| 2014/0211661 | A1* | 7/2014 | Gorkemli | H04L 41/12 370/255 |
| 2014/0355448 | A1* | 12/2014 | Kawano | H04L 45/64 370/236 |
| 2015/0003259 | A1* | 1/2015 | Gao | H04L 45/18 370/244 |

OTHER PUBLICATIONS

McKeown N. et al., "OpenFlow: Enabling Innovation in Campus Networks", ACM SIGCOMM Computer Communication Review, Apr. 2008, pp. 69-74, v. 38, No. 2, United States.

(Continued)

Primary Examiner — Khaled Kassim
(74) Attorney, Agent, or Firm — Kunzler Law Group; Katherine S. Brown

(57) ABSTRACT

Embodiments of the invention relate to switch mode transition and processing upon loss of controller communication. One embodiment includes losing a connection with a controller by a switch device, entering a particular mode by the switch device, transferring flow entries of the switch device to one or more tables, and notifying network application protocols that correspond to the transferred flow entries.

12 Claims, 7 Drawing Sheets

(56) References Cited

OTHER PUBLICATIONS

Mell, P. et al., "The NIST Definition of Cloud Computing", Special Publication, Version 15, Oct. 7, 2009, 2 pages, National Institute of Standards and Technology, Information Technology Laboratory, USA.

* cited by examiner

| Flow Type | OpenFlow Entry | Forwarding Table Entry | Protocol to Be Notified |
|---|---|---|---|
| Layer 2 Unicast | Match: VLAN, DMAC Action: Output to Port | FDB (L2 MAC Address table) | None |
| Layer 3 Unicast | Match: VLAN, DMAC (RTR MAC) DIP/Mask Action: SMAC (RTR MAC), DMAC, Port, TTL decrement | L3 Routing Table | Route Table Manager (RTM) |
| Layer 2 Multicast | Match: VLAN, DMAC Action: Output to Ports | L2 Multicast table | IGMP snooping |
| Layer 2 IP Multicast | Match: VLAN, SIP, DIP Action: Output to Ports | IP Multicast table | IGMP snooping |

FIG. 5

OPENFLOW SWITCH MODE TRANSITION PROCESSING

BACKGROUND

Embodiments of the invention relate to switching environments, and in particular, switch mode transition and processing upon loss of controller communication.

OpenFlow switches are based on an Ethernet switch with an internal flow table, and a standardized interface to add and remove flow entries. Ethernet switches and routers may contain flow tables (typically built from ternary content-addressable memory (TCAM)) that run at line-rate to implement firewalls, network address translation (NAT), quality of service (QoS), and to collect statistics.

In OpenFlow, upon loss of communication with a controller, packets that cannot match any flow entries will be dropped. The packet drop continues to worsen as flow entries might become invalid due to timing out, or all the exiting flow entries may become invalidated immediately, which cause packets to become flooded during transition.

BRIEF SUMMARY

Embodiments of the invention relate to switch mode transition and processing upon loss of controller communication. One embodiment includes losing a connection with a controller by a switch device, entering a particular mode by the switch device, transferring flow entries of the switch device to one or more tables, and notifying network application protocols that correspond to the transferred flow entries.

Another embodiment comprises a computer program product for switch device processing upon communication loss. The computer program product comprising a computer readable storage medium having program code embodied therewith. The program code readable/executable by a processor to perform a method comprising: losing a connection with a controller by a switch device, entering a particular mode by the switch device, transferring flow entries of the switch device to one or more tables, and notifying network application protocols that correspond to the transferred flow entries.

One embodiment comprises a system. The system comprises a controller device and a plurality of connected switch devices coupled with the controller. In one embodiment, upon a particular switch device losing communication with the controller, the particular switch device transfers one or more flow entries to one or more forwarding tables and notifies one or more network application protocols that correspond to the transferred one or more flow entries.

These and other features, aspects and advantages of the present invention will become understood with reference to the following description, appended claims and accompanying figures.

BRIEF DESCRIPTION OF THE SEVERAL VIEWS OF THE DRAWINGS

FIG. 5 illustrates a table of flow entries that may be transferred to forwarding tables, in accordance with an embodiment of the invention;

DETAILED DESCRIPTION

Figure 1:
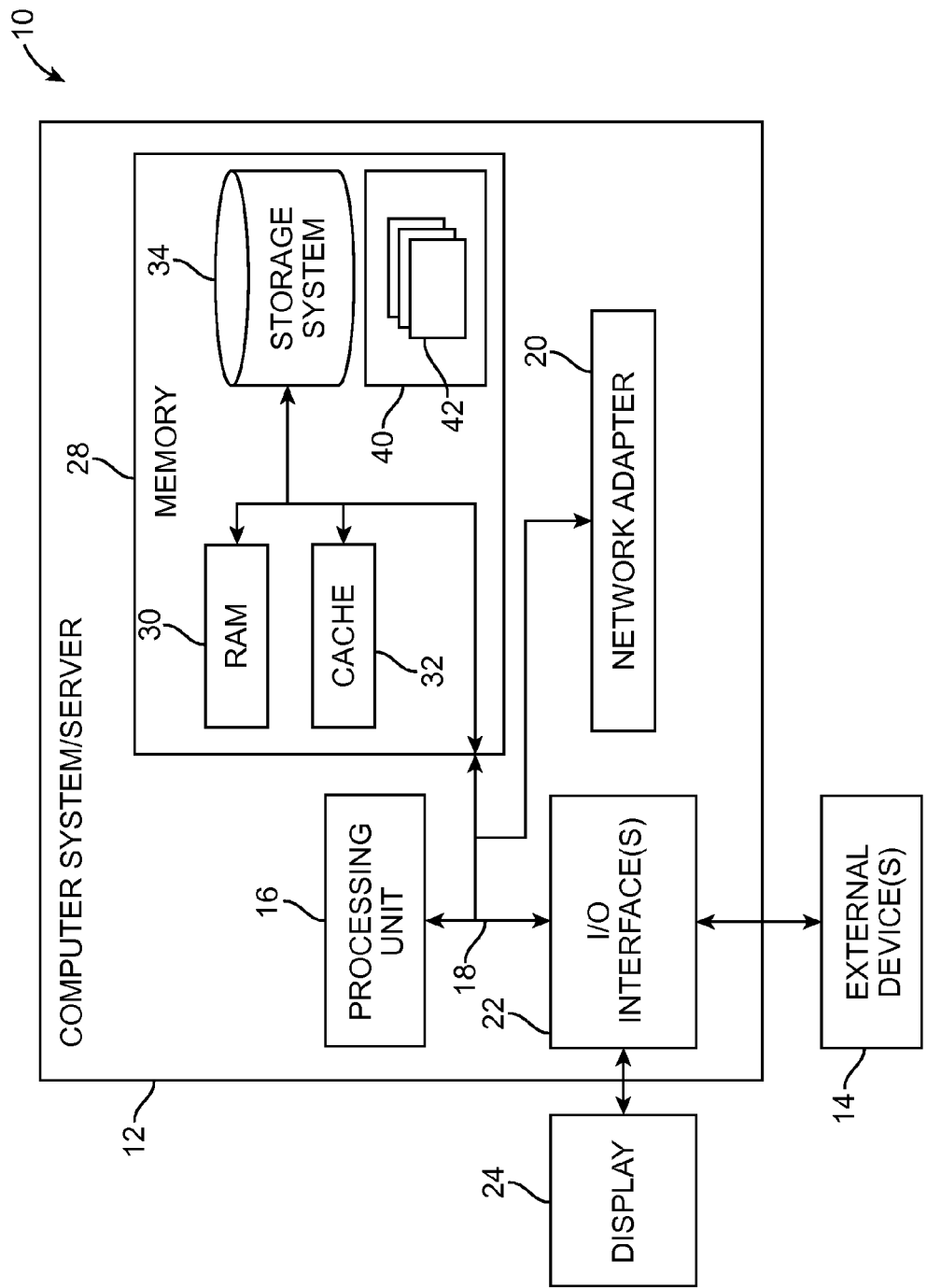
FIG. 1 depicts a cloud computing node according to an embodiment of the present invention.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and be rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating systems, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
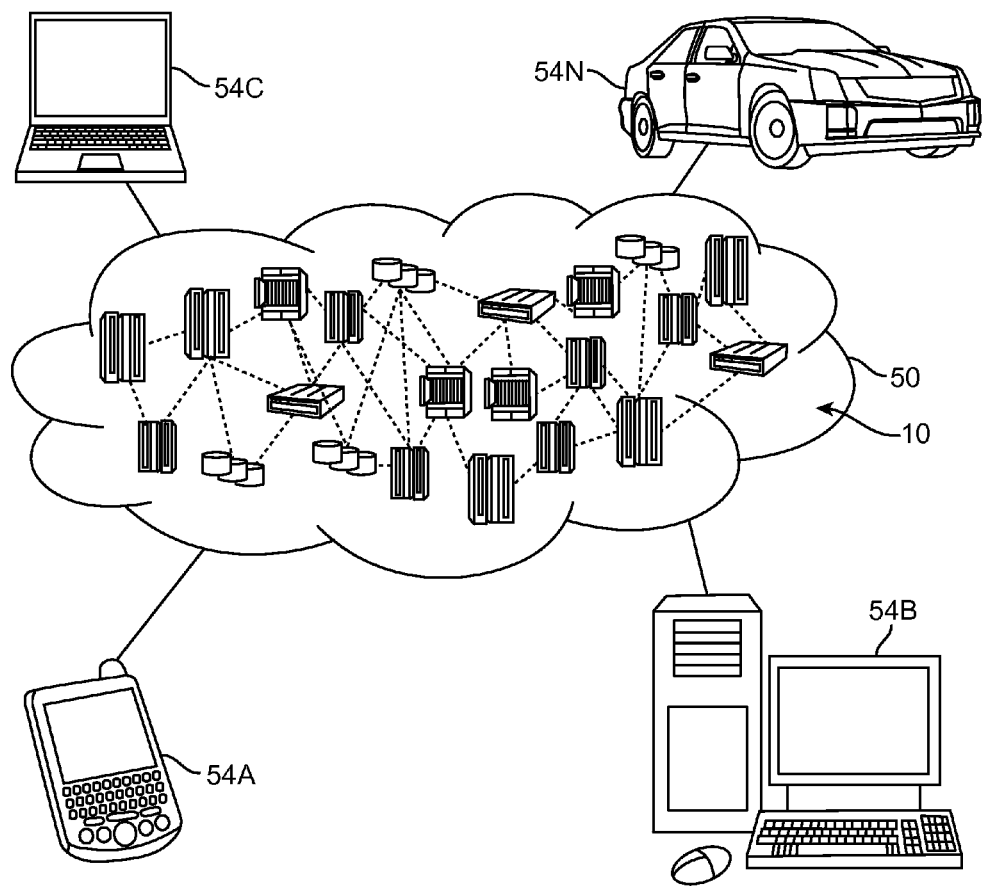
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
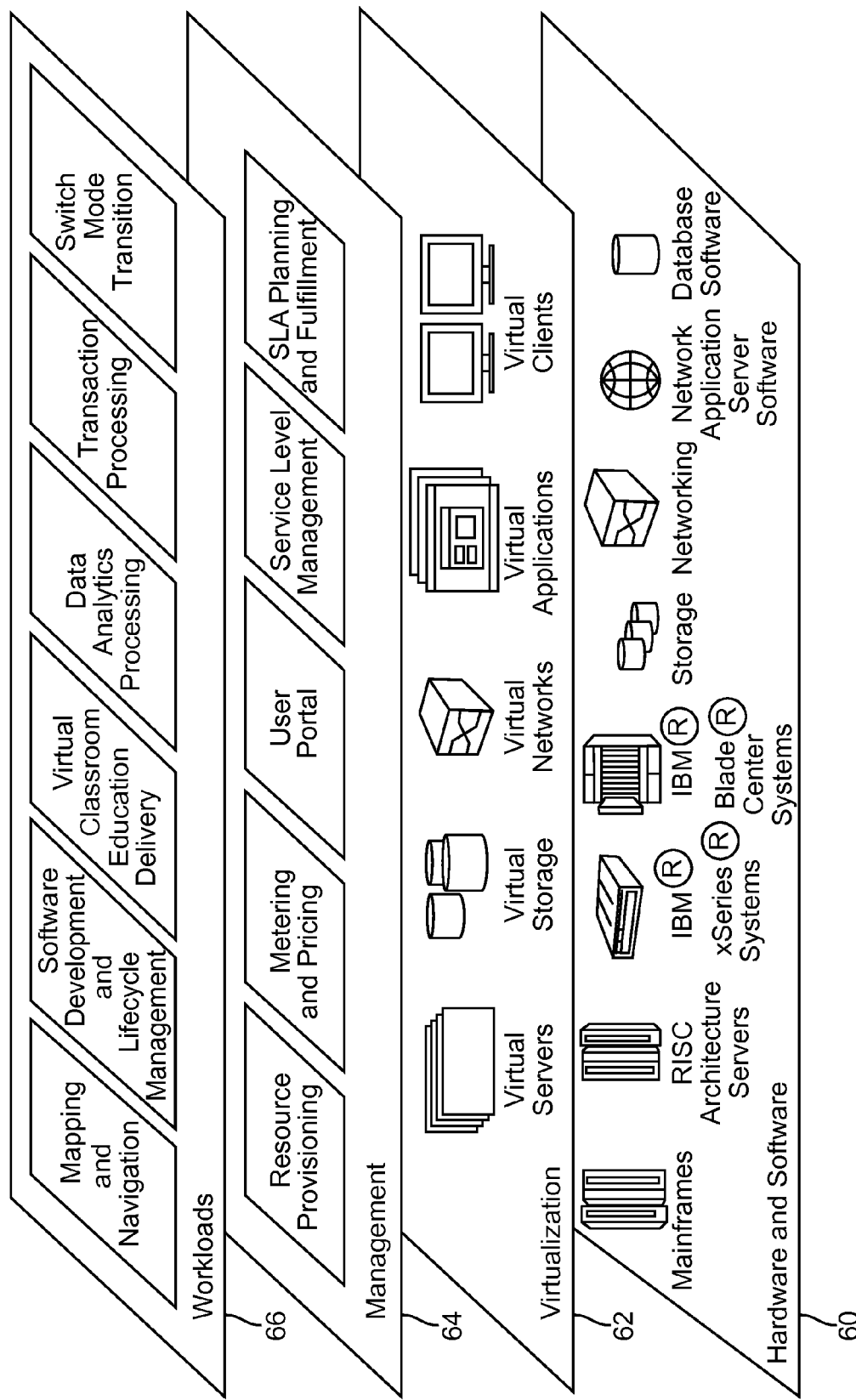
FIG. 3 depicts an abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM xSeries® systems, IBM BladeCenter® systems, storage devices, networks, and networking components. Examples of software components include network application server software. In one example, IBM WebSphere® application server software and database software. In one example, IBM DB2® database software. (IBM, zSeries, pSeries, xSeries, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and switch mode transition and processing. As mentioned above, all of the foregoing examples described with respect to FIG. 3 are illustrative only, and the invention is not limited to these examples.

It is understood all functions of the present invention as described herein are typically performed by systems 600 and 700 (FIGS. 6 and 7) using one or more embodiments, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of clustered computing environment now known or later developed.

According to an embodiment of the invention, a process for switch mode transition and processing is implemented by the system 600 (FIG. 6) and the system 700 (FIG. 7) and comprises losing a connection with a controller by a switch device, entering a particular mode by the switch device, transferring flow entries of the switch device to one or more tables, and notifying network application protocols that correspond to the transferred flow entries.

Figure 4:
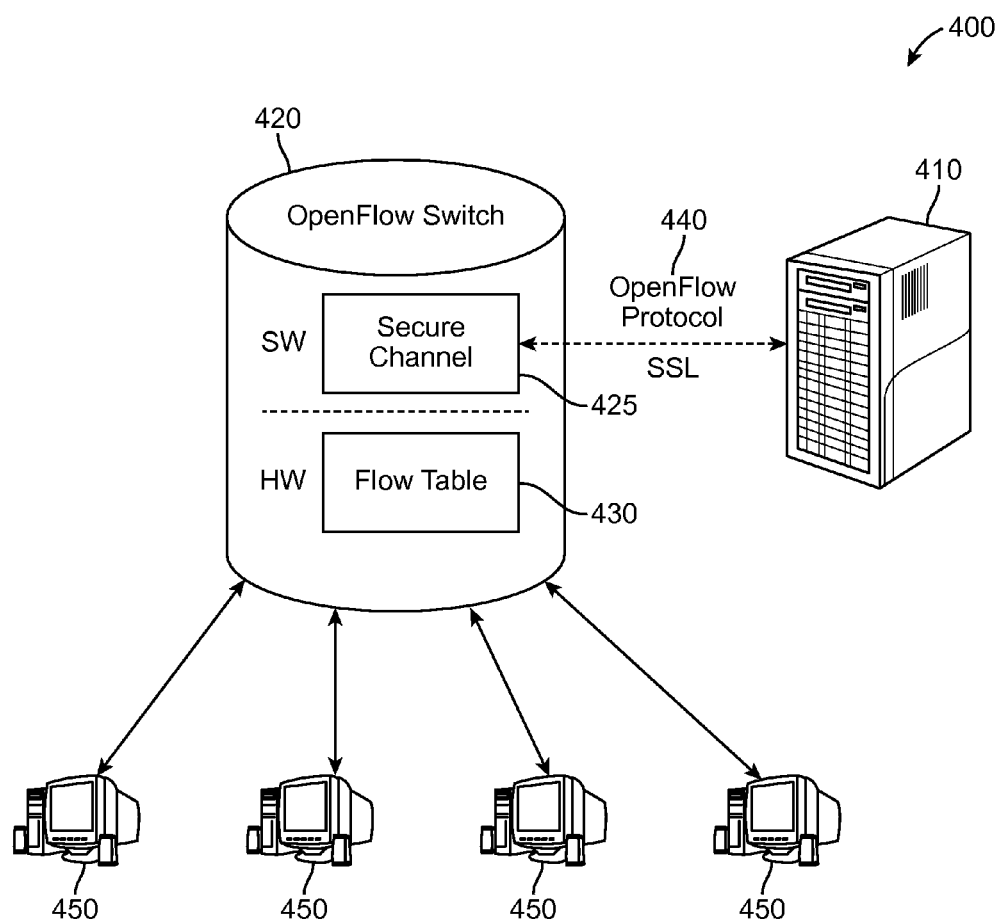
FIG. 4 illustrates a block diagram of a system including an OpenFlow switch connected with a controller, in accordance with an embodiment of the invention.

FIG. 4 shows a block diagram of a system 400 including a switch 420 (e.g., an OpenFlow switch) connected with a controller 410, in accordance with an embodiment of the invention. In one embodiment of the invention, the system 400 includes one or more computing systems 450 connected to the switch 420. OpenFlow provides an open protocol to program one or more flow tables 430 in different switches and routers. The datapath of the switch 420 comprises of a flow table 430, and an action associated with each flow entry. The set of actions supported by the switch 420 is extensible. The switch 420 comprises at least three parts: the flow table 430, with an action associated with each flow entry to inform the switch how to process the communication flow, a secure channel 425 that connects the switch 420 to the controller 410 that allows commands and packets to be sent between the controller 410 and the switch 420 using the OpenFlow protocol 440, which provides an open and standard way for the controller 410 to communicate with the switch 420. By specifying a standard interface (the OpenFlow protocol 440) through which entries in the flow table 430 may be defined externally, the switch 420 avoids the necessity for having to be programmed.

In one embodiment of the invention, the switch 420 may have one or more application specific integrated circuits (ASICs) that may include one or more flow tables 430. In one embodiment, the flow table 430 may comprise one or more Ternary content addressable memory (TCAM) devices, or other hardware devices. In one embodiment of the invention, the controller 410 adds and removes flow entries from the flow table 430.

In one embodiment of the invention, the switch 420 may comprise a dedicated OpenFlow switch that does not support normal Layer 2 and Layer 3 processing, or an OpenFlow-enabled general purpose Ethernet switch, for which the OpenFlow protocol 440 and interfaces have been added as a feature. A dedicated OpenFlow switch is a "dumb" datapath element that forwards packets between ports, as defined by the controller 410.

In one embodiment of the invention, flows may be broadly defined, and are limited only by the capabilities of the particular implementation of the flow table 430. For example, a flow may comprise a transmission control protocol (TCP) connection, all packets from a particular media access control (MAC) address or Internet protocol (IP) address, all packets with the same virtual local area network (VLAN) tag, all packets from the same switch port, etc. Each flow entry has an action associated with it; such as basic actions (that all dedicated OpenFlow switches support). One basic action is to forward the flow's packets to a given port (or ports), which allows packets to be routed through the network. Another basic action is to encapsulate and forward the flow's packets to a controller (e.g., controller 410). A packet is delivered to the secure channel 425, where it is encapsulated and sent to a controller. This action may be used for the first packet in a new flow, so that the controller 410 may determine if the flow should be added to the flow table 430. Another action may comprise dropping the flow's packets. This action may be used for security, to curb denial of service attacks, to reduce spurious broadcast discovery traffic from end-hosts, etc.

In one embodiment of the invention, an entry in the flow table 430 has three fields: (1) a packet header that defines the flow, (2) the action, which defines how the packets should be processed, and (3) statistics, which keep track of the number of packets and bytes for each flow, and the time since the last packet matched the flow (to assist with the removal of inactive flows).

In one embodiment of the invention, the switch 420 comprises an OpenFlow-enabled switch. In one embodiment, the flow table 420 uses existing hardware, such as a TCAM, and the secure channel 425 and protocol 440 may be ported to run on the operating system of the switch 420. In one embodiment, the flow table 430 and other flow tables of other switches that may be connected are managed by the same controller 410. In one embodiment of the invention, the OpenFlow protocol 440 allows the switch 420 to be controlled by two or more controllers for increased performance or robustness.

In a classical router or switch, the fast packet forwarding (data path) and the high level routing decisions (control path) occur on the same device. An OpenFlow switch separates these two functions. The data path portion resides on the switch 420, while high-level routing decisions are moved to the controller 410 (e.g., a server). The OpenFlow switch 420 and controller 410 communicate via the OpenFlow protocol 440, which defines messages, such as packet-received, send-packet-out, modify-forwarding-table, and get-statistics. The data path of the OpenFlow switch 420 presents a clean flow table abstraction, where each flow entry contains a set of packet fields to match, and an action (such as send-out-port, modify-field, or drop). When the OpenFlow switch 410 receives a packet for the first time (i.e., never received before), for which it has no matching flow entries, the OpenFlow switch 420 sends this packet to the controller 410. The controller 410 then makes a decision on how to handle this packet. The controller 410 may drop the packet, or it may add a flow entry directing the switch 410 on how to forward similar packets in the future.

FIG. 5 illustrates a table 500 of example flow entries that may be transferred to forwarding tables (e.g., flow table 430, FIG. 4) of OpenFlow switches (e.g., switch 420), in accordance with an embodiment of the invention. In one example, the table 500 shows flow types including Layer 2 unicast, Layer 3 unicast, Layer 2 multicast and Layer 2 IP multicast. In one example, the OpenFlow entries include a match and associated action for the flow types. In one example, the table 500 shows example forwarding table entries and the protocol to be notified, according to one embodiment of the invention.

Figure 6:
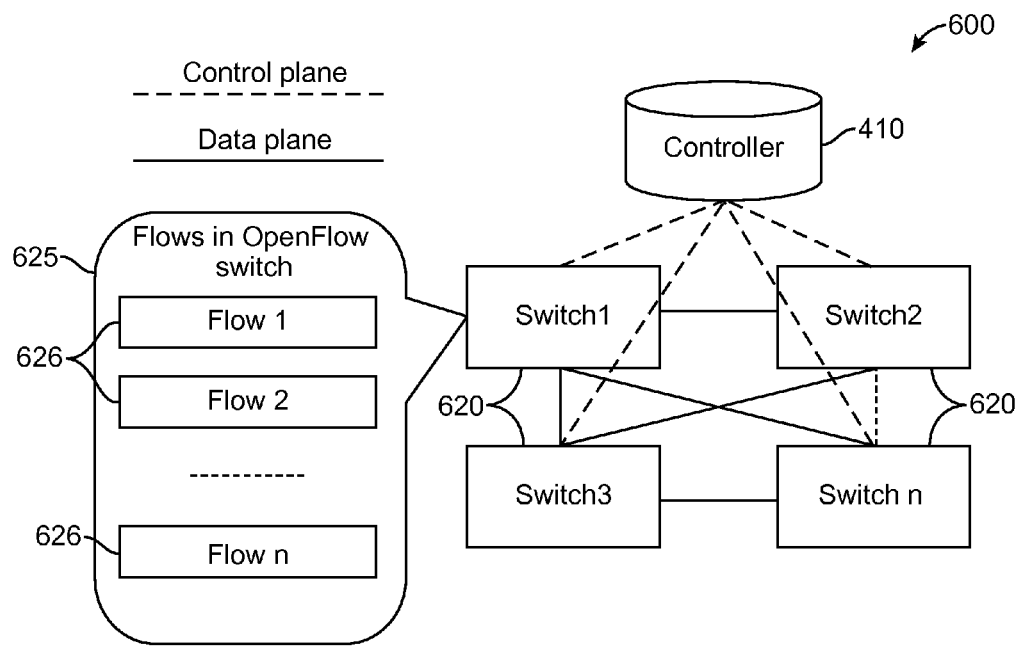
FIG. 6 illustrates a block diagram of an OpenFlow system, in accordance with an embodiment of the invention.

FIG. 6 illustrates a block diagram 600 of an OpenFlow system, in accordance with an embodiment of the invention. In one embodiment of the invention, the OpenFlow system comprises a controller 410 and multiple switches 620. In one embodiment of the invention, each of the switches 620 comprises an OpenFlow switch similar to switch 420, and each includes flows 625 comprising of multiple flow entries 626 1, 2, to n (n being a positive integer). In one embodiment of the invention, the switches 620 are connected and are controlled by the controller 410 and communicate with each other. As shown, the switches 620 are each in communication with the controller 410.

Figure 7:
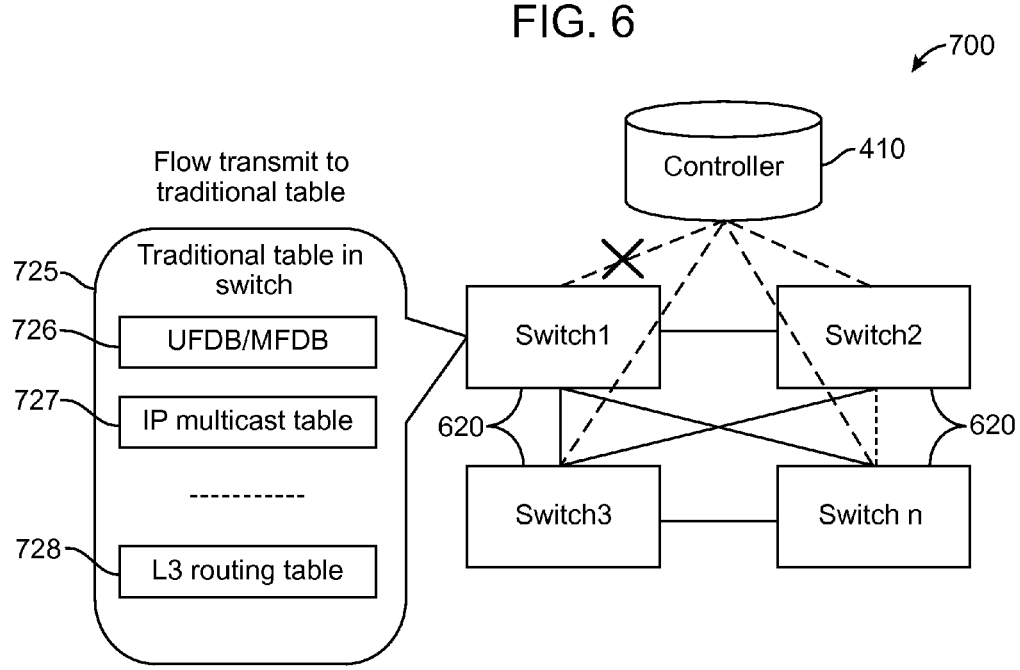
FIG. 7 illustrates a block diagram of an OpenFlow system with communication loss to a switch device, in accordance with an embodiment of the invention.

FIG. 7 illustrates a block diagram 700 of the OpenFlow system (FIG. 6), where communication between a particular switch 620 is lost with the controller 410, in accordance with an embodiment of the invention. In one embodiment of the invention, the "X" represents loss of communication (in a control plane) between the controller 410 and a particular switch 620. In one embodiment of the invention, when a switch 620 loses connection with the controller 410, the existing flow entries 625 are not invalidated immediately. In one embodiment of the invention, all of the flow entries are transferred into the forwarding table 725 (e.g., FDB, routing or multicast) and notified to the corresponding network application protocol. In one embodiment of the invention, once the forwarding table 725 is populated in the switch 620, the existing OpenFlow entries 625 will be removed from the switch 620.

In one example embodiment, upon the communication loss with the controller 410 as indicated by the "X", the switch 620 transitions from OpenFlow mode to a legacy or traditional mode and transfers its flow entries 625 to the forwarding table 725, and notifies one or more network application protocols (e.g., RTM, IGMP snooping, etc.) that correspond to the transferred flow entries 625.

Unlike traditional OpenFlow switches, in one embodiment of the invention upon loss of communication between a controller 410 and a switch 620, the switch 620 transitions to a traditional forwarding mode gracefully so that all existing flow entries are transferred into the traditional forwarding tables (e.g., FDB, Multicast and routing) and notifies (e.g., through messaging, packets, etc.) the corresponding network application protocols (of the secure channel) before being deleted, then the switch enters into the traditional mode. In one embodiment of the invention, based on the transferring of flow entries 625 to the table 725, no packets are lost and the functionalities of the existing flow entries are retained by using the traditional forwarding tables (e.g., tables 726, 727 to 728). In one embodiment of the invention, flooding is decreased significantly since most incoming packets may be processed by the transferred flow entries 625.

Figure 8:
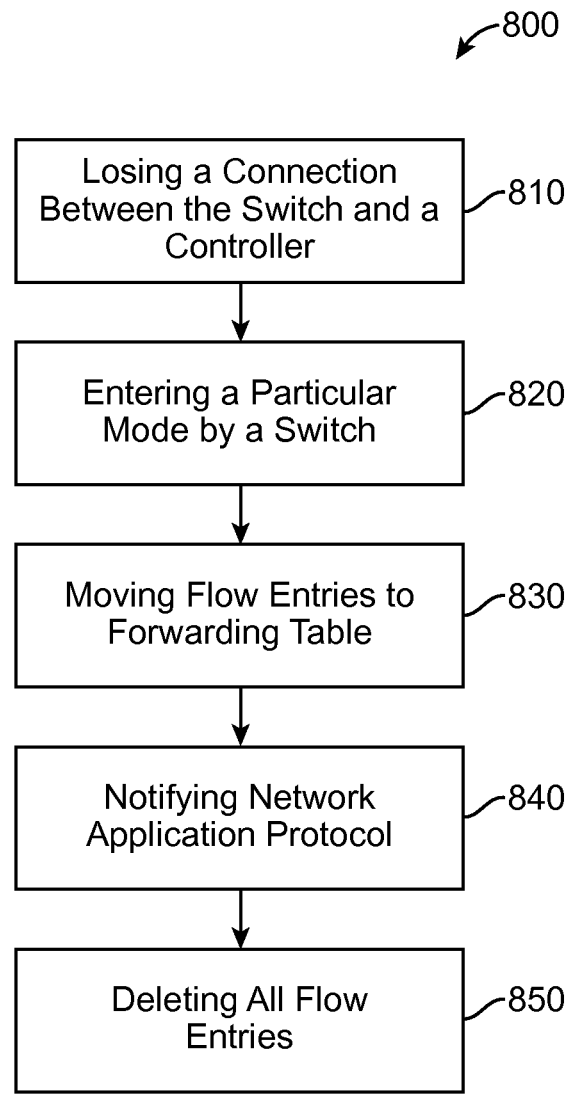
FIG. 8 is a block diagram showing a process for switching mode transition and processing upon communication loss with a controller, in accordance with an embodiment of the invention.

FIG. 8 is a block diagram showing a process 800 for switch (e.g., switch 420, FIG. 4, switch 620 FIGS. 6-7) mode transition and processing upon communication loss with a controller (e.g., controller 410, FIGS. 4, 6 and 7) in accordance with an embodiment of the invention. In one embodiment of the invention, in block 810 a connection is lost between a switch and a controller. In block 820, a switch enters a particular mode, such as transitioning from an OpenFlow switch mode to a legacy switch mode. In one embodiment of the invention, in block 830 upon the transition of the switch mode based on the loss of the communication between the switch and the controller, flow entries from the switch are transferred to forwarding tables in the switch.

In one embodiment of the invention, in block 840 the corresponding network protocols for the flow entries are notified. In one embodiment of the invention, in block 850 after the flow entries are transferred to the switch tables, and the corresponding network protocols are notified, the flow entries for the switch are removed/deleted.

The system 600/700 using embodiments of the invention may include one or more source programs, executable programs (object code), scripts, or any other entity comprising a set of computer program instructions to be performed. When the system 600/700 includes a source program, then the program is usually translated via a compiler, assembler, interpreter, or the like, which may or may not be included within a storage device. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, propagation medium, or other physical device or means that can contain or store a computer program for use by or in connection with a computer related system or method.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, propagation medium, or other physical device or means that can contain or store a computer program for use by or in connection with a computer related system or method.

More specific examples (a non-exhaustive list) of the computer-readable medium would include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched (as in paper tape, punched cards, etc.), as the program can be electronically captured, via for instance optical scanning of the paper or other medium, then compiled, interpreted or otherwise processed in a suitable manner if necessary, and then stored in a computer memory.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

In one embodiment, where the system 100 is implemented in hardware, the system 100 can be implemented with any one or a combination of the following technologies, which are each well known in the art: a discrete logic circuit(s) having logic gates for implementing logic functions upon data signals, an ASIC having appropriate combinational logic gates, a programmable gate array(s) (PGA), a field programmable gate array (FPGA), etc.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be emphasized that the above-described embodiments of the present invention, particularly, any "preferred" embodiments, are merely possible examples of implementations, merely set forth for a clear understanding of the principles of the invention.

Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A method comprising:
   losing a connection with a controller by a switch device;
   transitioning from an OpenFlow switching mode to a legacy switching mode by the switching device in response to losing the connection with the controller;
   transferring flow entries of the switch device to one or more switch forwarding tables; and
   notifying network application protocols that correspond to the transferred flow entries,
   wherein flooding is decreased based on processing incoming packets using the flow entries stored in the forwarding tables.

2. The method of claim 1, further comprising: removing the flow entries of the switch device after the transferring of the flow entries to the switch forwarding tables is completed.

3. The method of claim 2, wherein the switch device comprises an Ethernet switch device and an interface for adding and removing the flow entries.

4. The method of claim 3, wherein functionality of the flow entries is maintained by using the switch forwarding tables.

5. A computer program product for switch device processing upon communication loss, the computer program product comprising a computer readable storage medium having program code embodied therewith, the program code readable/executable by a processor to perform a method comprising:
   losing a connection with a controller by a switch device;
   transitioning from an OpenFlow switching mode to a legacy switching mode by the switching device in response to losing the connection with the controller;
   transferring flow entries of the switch device to one or more switch forwarding tables; and
   notifying network application protocols that correspond to the transferred flow entries,
   wherein flooding is decreased based on processing incoming packets using the flow entries stored in the forwarding tables.

6. The program of claim 5, further comprising: removing the flow entries of the switch device after the transferring of the flow entries to the switch forwarding tables is completed.

7. The program of claim 6, wherein the switch device comprises an Ethernet switch device and an interface for adding and removing the flow entries.

8. The program of claim 7, wherein functionality of the flow entries is maintained by using the switch forwarding tables.

9. A system comprising:
   a controller device; and
   a plurality of connected switch devices coupled with the controller, wherein upon a particular switch device losing communication with the controller, the particular switch device:
   transitions from an OpenFlow switching mode to a legacy switching mode;
   transfers one or more flow entries to one or more switch forwarding tables; and
   notifies one or more network application protocols that correspond to the transferred one or more flow entries
   wherein flooding is decreased based on processing incoming packets using the flow entries stored in the forwarding tables.

10. The system of claim 9, wherein the flow entries of the switch device are removed after the one or more flow entries are transferred to the forwarding tables.

11. The system of claim 10, wherein the particular switch device comprises an Ethernet switch device including an interface for adding and removing the one or more flow entries.

12. The system of claim 11, wherein functionality of the one or more flow entries is maintained by using the forwarding tables.

* * * * *